(12) United States Patent
Mann et al.

(10) Patent No.: US 9,124,481 B2
(45) Date of Patent: Sep. 1, 2015

(54) CUSTOM DIAMETER ATTRIBUTE IMPLEMENTERS

(71) Applicant: ALCATEL-LUCENT CANADA INC., Ottawa (CA)

(72) Inventors: Robert A. Mann, Carp (CA); Mikael Vihtari, Kanata (CA)

(73) Assignee: Alcatel Lucent, Boulogne-Billancourt (FR)

( * ) Notice: Subject to any disclaimer, the term of this patent is extended or adjusted under 35 U.S.C. 154(b) by 293 days.

(21) Appl. No.: 13/891,587

(22) Filed: May 10, 2013

(65) Prior Publication Data

US 2013/0326085 A1 Dec. 5, 2013

Related U.S. Application Data

(63) Continuation-in-part of application No. 13/482,690, filed on May 29, 2012, and a continuation-in-part of application No. 13/482,587, filed on May 29, 2012, now Pat. No. 8,804,931, and a continuation-in-part of application No. 13/602,579, filed on Sep. 4, 2012, now Pat. No. 8,850,064.

(51) Int. Cl.
*G06F 15/16* (2006.01)
*H04L 12/701* (2013.01)
*H04L 29/08* (2006.01)
*H04L 12/24* (2006.01)

(52) U.S. Cl.
CPC ............ *H04L 45/00* (2013.01); *H04L 67/1036* (2013.01); *H04L 67/2823* (2013.01); *H04L 41/0226* (2013.01)

(58) Field of Classification Search
USPC .................................. 709/238, 204, 206, 200
See application file for complete search history.

(56) References Cited

U.S. PATENT DOCUMENTS

| | | | | |
|---|---|---|---|---|
| 5,581,664 | A  * | 12/1996 | Allen et al. ..................... | 706/46 |
| 8,015,211 | B2 * | 9/2011 | Marceau et al. ............... | 707/802 |
| 2007/0226066 | A1 * | 9/2007 | Brunner et al. ................. | 705/26 |
| 2010/0281170 | A1 * | 11/2010 | Rui et al. ....................... | 709/227 |
| 2012/0284105 | A1 * | 11/2012 | Li ............................... | 705/14.23 |
| 2012/0297076 | A1 * | 11/2012 | Wu et al. ....................... | 709/227 |
| 2013/0104207 | A1 * | 4/2013 | Kroeselberg et al. ............. | 726/6 |
| 2014/0003431 | A1 * | 1/2014 | Mann et al. .................... | 370/392 |
| 2014/0068102 | A1 * | 3/2014 | Mann et al. .................... | 709/238 |

* cited by examiner

*Primary Examiner* — El Hadji Sall

(74) *Attorney, Agent, or Firm* — Kramer & Amado, P.C.

(57) ABSTRACT

Various exemplary embodiments relate to a method and related network node including one or more of the following: receiving a Diameter message at the DRA from an origin device, wherein the Diameter message includes an attribute-value pair (AVP) having a first value represented according to a first data type; establishing a context object in response to receiving the Diameter message; establishing, within the context object, a custom attribute object that corresponds to the AVP and provides access to at least a portion of the first value represented according to a second data type, wherein the second data type is different from the first data type; evaluating a rule that includes a context object reference, wherein the evaluation includes accessing the custom attribute object based on the context object reference; and transmitting a message based on the evaluation of the rule.

22 Claims, 6 Drawing Sheets

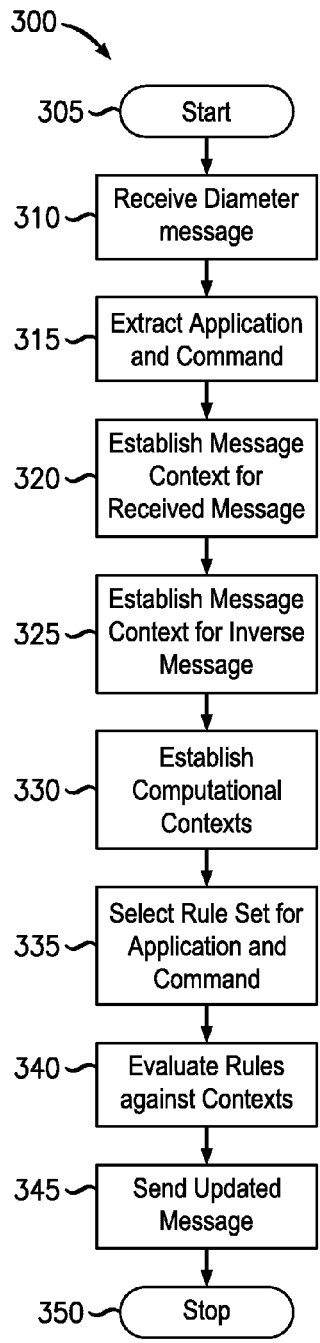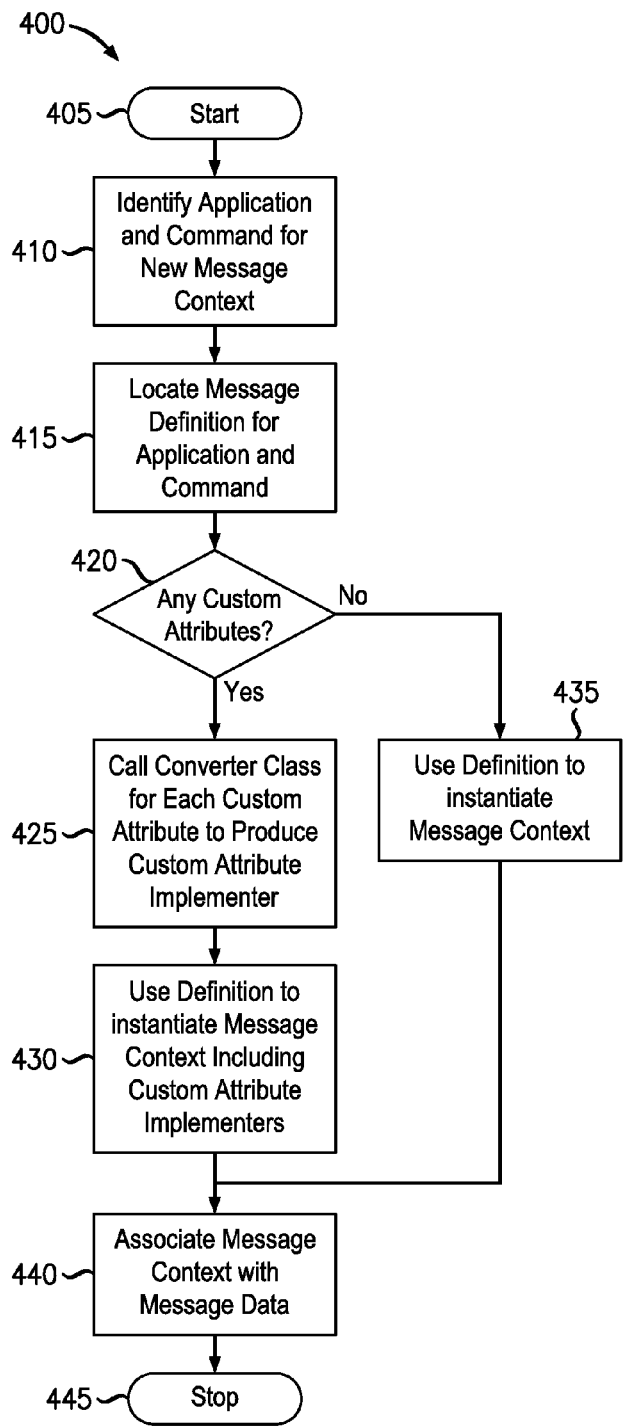
FIG. 3
FIG. 4

CUSTOM DIAMETER ATTRIBUTE IMPLEMENTERS

CROSS-REFERENCE TO RELATED APPLICATIONS

This application is a continuation-in-part the following co-pending applications, which are hereby incorporated by reference for as purposes as if fully set forth herein: application Ser. No. 13/482,690, filed on May 29, 2012, "ORGANIZATION OF DIAMETER ROUTING AGENT RULE SETS;" application Ser. No. 13/482,587, filed on May 29, 2012, "ROUTING DECISION CONTEXT OBJECTS;" application Ser. No. 13/602,579, filed on Sep. 4, 2012, "RULE ENGINE EVALUATION OF CONTEXT OBJECTS."

TECHNICAL FIELD

Various exemplary embodiments disclosed herein relate generally to communications networking.

BACKGROUND

Since its proposal in Internet Engineering Task Force (IETF) Request for Comments (RFC) 3588, the Diameter protocol has been increasingly adopted by numerous networked applications. For example, the Third Generation Partnership Project (3GPP) has adopted Diameter for various policy and charging control (PCC), mobility management, and IP multimedia subsystem (IMS) applications. As IP-based networks replace circuit-switched networks, Diameter is even replacing SS7 as the key communications signaling protocol. As networks evolve, Diameter is becoming a widely used protocol among wireless and wireline communications networks.

One significant aspect of the Diameter protocol is Diameter packet routing. Entities referred to as Diameter routing agents (DRAs) facilitate movement of packets in a network. In various deployments, DRAs may perform elementary functions such as simple routing, proxying, and redirect.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various embodiments described herein relate to a method performed by a Diameter Routing Agent (DRA) for processing a Diameter message, the method including: receiving a Diameter message at the DRA from an origin device, wherein the Diameter message includes an attribute-value pair (AVP) having a first value represented according to a first data type; establishing a context object in response to receiving the Diameter message; establishing, within the context object, a custom attribute object that corresponds to the AVP and provides access to at least a portion of the first value represented according to a second data type, wherein the second data type is different from the first data type; evaluating a rule that includes a context object reference, wherein the evaluation includes accessing the custom attribute object based on the context object reference; and transmitting a message based on the evaluation of the rule.

Various embodiments described herein relate to a Routing Agent (DRA) for processing a Diameter message, the DRA including: a rule storage configured to store a rule that includes a context object reference; a Diameter stack configured to receive a Diameter message from an origin device, wherein the Diameter message includes an attribute-value pair (AVP) having a first value represented according to a first data type; a context creator configured to: establish a context object in response to receiving the Diameter message, and establish, within the context object, a custom attribute object that corresponds to the AVP and provides access to at least a portion of the first value represented according to a second data type, wherein the second data type is different from the first data type; a rule engine configured to evaluate the rule, wherein the evaluation includes accessing the custom attribute object based on the context object reference; and a message handler configured to transmit, via the Diameter stack, a message based on the evaluation of the rule.

Various embodiments described herein relate to a non-transitory machine-readable storage medium encoded with instructions for execution by a Diameter Routing Agent (DRA) for processing a Diameter message, the medium including: instructions for receiving a Diameter message at the DRA from an origin device, wherein the Diameter message includes an attribute-value pair (AVP) having a first value represented according to a first data type; instructions for establishing a context object in response to receiving the Diameter message; instructions for establishing, within the context object, a custom attribute object that corresponds to the AVP and provides access to at least a portion of the first value represented according to a second data type, wherein the second data type is different from the first data type; instructions for evaluating a rule that includes a context object reference, wherein the evaluation includes accessing the custom attribute object based on the context object reference; and instructions for transmitting a message based on the evaluation of the rule.

Various embodiments described wherein establishing the custom attribute object includes: instantiating a converter object; and invoking a method of the converter object that instantiates the custom attribute object based on the AVP.

Various embodiments described wherein accessing the custom attribute object includes: determining a first new value for the at least a portion of the value, wherein the first new value is represented according to the second data type; invoking a method of the converter object that: generates a second new value based on the first new value, wherein the second new value is represented according to the first data type; and inserts the second new value type into the AVP.

Various embodiments described wherein: the AVP includes a second value; and the custom attribute object selects the second data type for representation of the at least a portion of the first value based on the second value.

Various embodiments described wherein the AVP is a Subscription-Id AVP, the first value is a Subscription-Id-Data AVP, and the second value is a Subscription-Id-Type AVP.

Various embodiments described wherein establishing the context object in response to receiving the Diameter message includes: locating a message definition associated with a message type of the Diameter message, and identifying, in the message definition, a pointer to a custom attribute implementer; and establishing, within the context object, the custom attribute object includes: instantiating the custom attribute implementer as the custom attribute object.

Various embodiments described wherein the custom attribute object providing access to at least a portion of the first value represented according to a second data type includes: providing access to a first portion of the first value represented according to the second data type; and providing access to a second portion of the first value.

Various embodiments described wherein the second portion of the first value is represented according to a third data type that is different from the second data type.

Various embodiments described wherein the AVP stores an IP address, the first data type is an OctetString type, and the second data type is a dotted decimal type.

BRIEF DESCRIPTION OF THE DRAWINGS

In order to better understand various exemplary embodiments, reference is made to the accompanying drawings, wherein:

FIG. 3 illustrates an exemplary method for processing Diameter messages;

FIG. 4 illustrates an exemplary method for establishing a message context;

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. As used herein, the terms "context" and "context object" will be understood to be synonymous, unless otherwise indicated.

Diameter Routing Agents (DRAs) available today provide only basic functionalities typically defined in hard coding or scripting. As such, users may typically not be empowered to easily and flexibly define more complex behaviors for a DRA. In view of the foregoing, it would be desirable to provide a method and system that facilitates user definition and extension of DRA message processing behavior. For example, it would be desirable to allow a user to define rules and configurations for performing load balancing at a DRA with respect to received Diameter messages.

Figure 1:
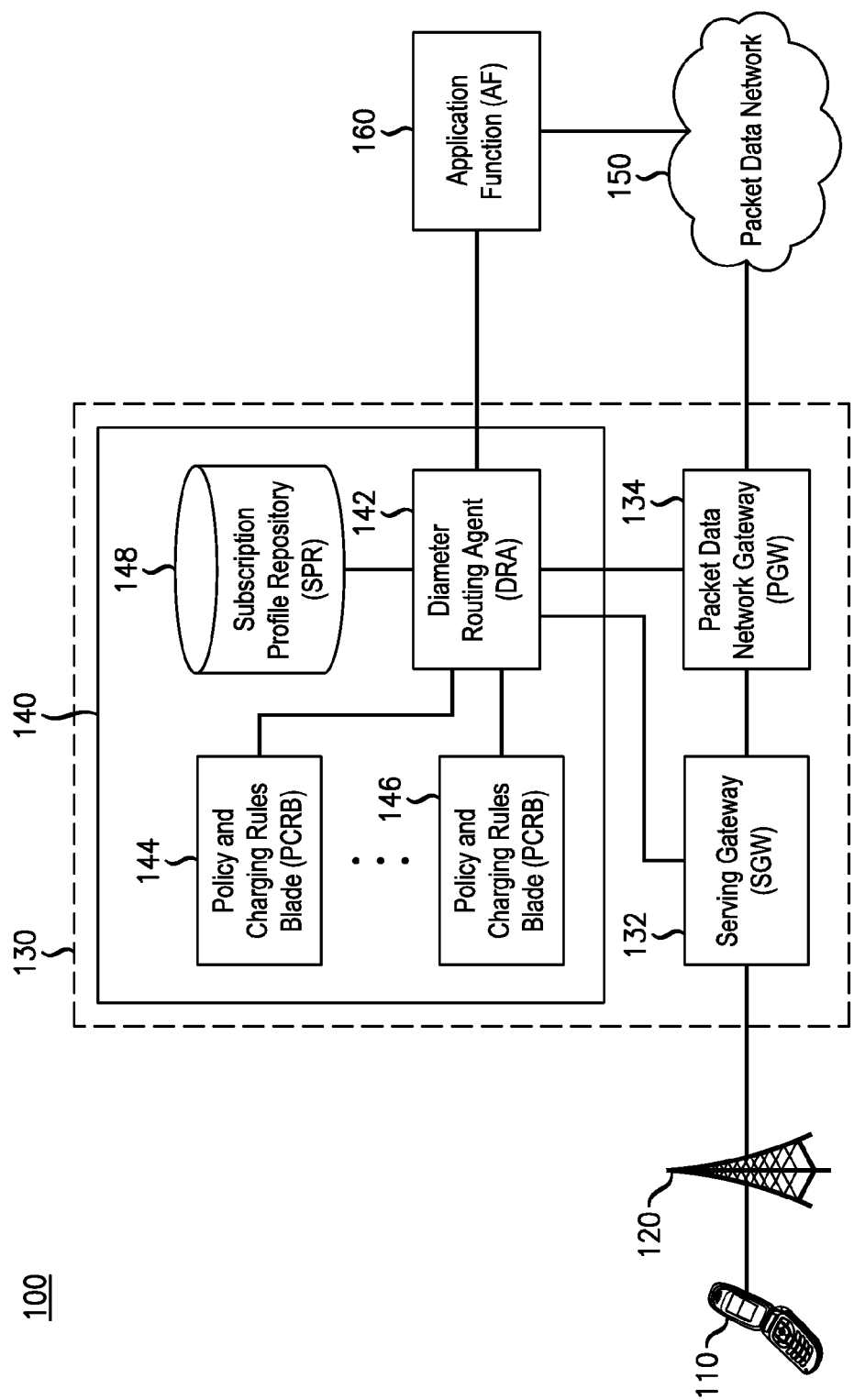
FIG. 1 illustrates an exemplary network environment for a Diameter Routing Agent.

FIG. 1 illustrates an exemplary network environment 100 for a Diameter Routing Agent (DRA) 142. Exemplary network environment 100 may be a subscriber network for providing various services. In various embodiments, subscriber network 100 may be a public land mobile network (PLMN). Exemplary subscriber network 100 may be telecommunications network or other network for providing access to various services. Exemplary subscriber network 100 may include user equipment 110, base station 120, evolved packet core (EPC) 130, packet data network 150, and application function (AF) 160.

User equipment 110 may be a device that communicates with packet data network 150 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, tablet, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by the relevant 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the relevant 3GPP standards. EPC 130 may include a serving gateway (SGW) 132, a packet data network gateway (PGW) 134, and a session control device 140.

Serving gateway (SGW) 132 may be a device that provides gateway access to the EPC 130. SGW 132 may be one of the first devices within the EPC 130 that receives packets sent by user equipment 110. Various embodiments may also include a mobility management entity (MME) (not shown) that receives packets prior to SGW 132. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the Proxy Mobile IP standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services.

Session control device 140 may be a device that provides various management or other functions within the EPC 130. For example, session control device 140 may provide a Policy and Charging Rules Function (PCRF). In various embodiments, session control device 140 may include an Alcatel Lucent 5780 Dynamic Services Controller (DSC). Session control device 140 may include a DRA 142, a plurality of policy and charging rules blades (PCRBs) 144, 146, and a subscriber profile repository 148.

As will be described in greater detail below, DRA 142 may be an intelligent Diameter Routing Agent. As such, DRA 142 may receive, process, and transmit various Diameter messages. DRA 142 may include a number of user-defined rules that govern the behavior of DRA 142 with regard to the various Diameter messages DRA 142 may encounter. Based on such rules, the DRA 142 may operate as a relay agent, proxy agent, or redirect agent. For example, DRA 142 may relay received messages to an appropriate recipient device. Such routing may be performed with respect to incoming and outgoing messages, as well as messages that are internal to the session control device.

Policy and charging rules blades (PCRB) 144, 146 may each be a device or group of devices that receives requests for application services, generates PCC rules, and provides PCC rules to the PGW 134 or other PCENs (not shown). PCRBs 144, 146 may be in communication with AF 160 via an Rx interface. As described in further detail below with respect to AF 160, PCRB 144, 146 may receive an application request in the form of an Authentication and Authorization Request (AAR) from AF 160. Upon receipt of an AAR, PCRB 144, 146 may generate at least one new PCC rule for fulfilling the application request.

PCRB 144, 146 may also be in communication with SGW 132 and PGW 134 via a Gxx and a Gx interface, respectively. PCRB 144, 146 may receive an application request in the form of a credit control request (CCR) from SGW 132 or PGW 134. As with an AAR, upon receipt of a CCR, PCRB 144, 146 may generate at least one new PCC rule for fulfilling the application request. In various embodiments, the AAR and the CCR may represent two independent application requests to be processed separately, while in other embodiments, the AAR and the CCR may carry information regarding a single application request and PCRB 144, 146 may create at least one PCC rule based on the combination of the AAR and the CCR. In various embodiments, PCRB 144, 146 may be capable of handling both single-message and paired-message application requests.

Upon creating a new PCC rule or upon request by the PGW 134, PCRB 144, 146 may provide a PCC rule to PGW 134 via the Gx interface. In various embodiments, such as those implementing the proxy mobile IP (PMIP) standard for example, PCRB 144, 146 may also generate QoS rules. Upon creating a new QoS rule or upon request by the SGW 132, PCRB 144, 146 may provide a QoS rule to SGW 132 via the Gxx interface.

Subscriber profile repository (SPR) 148 may be a device that stores information related to subscribers to the subscriber network 100. Thus, SPR 148 may include a machine-readable storage medium such as read-only memory (ROM), random-access memory (RAM), magnetic disk storage media, optical storage media, flash-memory devices, and/or similar storage media. SPR 148 may be a component of one of PCRB 144, 146 or may constitute an independent node within EPC 130 or session control device 140. Data stored by SPR 138 may include subscriber information such as identifiers for each subscriber, bandwidth limits, charging parameters, and subscriber priority.

Packet data network 150 may be any network for providing data communications between user equipment 110 and other devices connected to packet data network 150, such as AF 160. Packet data network 150 may further provide, for example, phone or Internet service to various user devices in communication with packet data network 150.

Application function (AF) 160 may be a device that provides a known application service to user equipment 110. Thus, AF 160 may be a server or other device that provides, for example, a video streaming or voice communication service to user equipment 110. AF 160 may further be in communication with the PCRB 144, 146 of the EPC 130 via an Rx interface. When AF 160 is to begin providing known application service to user equipment 110, AF 160 may generate an application request message, such as an authentication and authorization request (AAR) according to the Diameter protocol, to notify the PCRB 144, 146 that resources should be allocated for the application service. This application request message may include information such as an identification of the subscriber using the application service, an IP address of the subscriber, an APN for an associated IP-CAN session, or an identification of the particular service data flows that must be established in order to provide the requested service.

As will be understood, various Diameter applications may be established within subscriber network 100 and supported by DRA 142. For example, an Rx application may be established between AF 160 and each of PCRBs 144, 146. As another example, an Sp application may be established between SPR 148 and each of PCRBs 144, 146. As yet another example, an S9 application may be established between one or more of PCRBs 144, 146 and a remote device implementing another PCRF (not shown). As will be understood, numerous other Diameter applications may be established within subscriber network 100. In various embodiments, the DRA 142 may provide similar support to applications defined according to other protocols. For example, the DRA 142 may additionally provide support for RADIUS or SS7 applications. Various modifications to the techniques and components described herein for supporting such other protocols will be apparent. In various embodiments, the DRA 142 may provide similar support to applications defined according to other protocols. For example, the DRA 142 may additionally provide support for RADIUS or SS7 applications. Various modifications to the techniques and components described herein for supporting such other protocols will be apparent.

In supporting the various potential Diameter applications, DRA 142 may receive Diameter messages, process the messages, and perform actions based on the processing. For example, DRA 142 may receive a Gx CCR from PGW 134, identify an appropriate PCRB 144, 146 to process the Gx CCR, and forward the Gx CCR to the identified PCRB 144, 146. DRA 142 may also act as a proxy by modifying the subsequent Gx CCA sent by the PCRB 144, 146 to carry an origin-host identification pointing to the DRA 142 instead of the PCRB 144, 146. Additionally or alternatively, DRA 142 may act as a redirect agent or otherwise respond directly to a request message by forming an appropriate answer message and transmitting the answer message to an appropriate requesting device.

Figure 2:
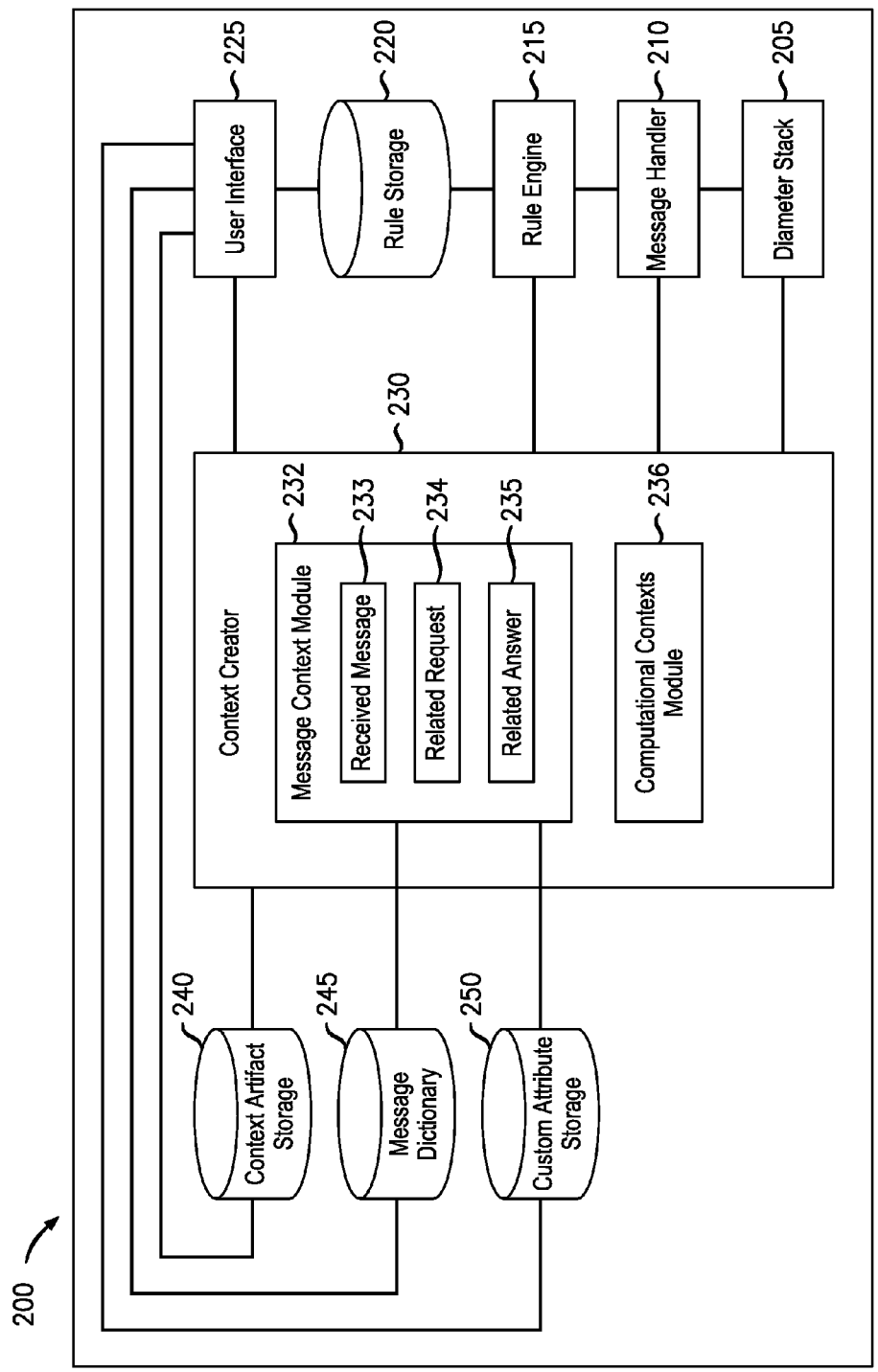
FIG. 2 illustrates an exemplary Diameter Routing Agent.

FIG. 2 illustrates an exemplary Diameter Routing Agent (DRA) 200. DRA 200 may be a standalone device or a component of another system. For example, DRA 200 may correspond to DRA 142 of exemplary environment 100. In such an embodiment, DRA 142 may support various Diameter applications defined by the 3GPP such as Gx, Gxx, Rx, or Sp. It will be understood that DRA 200 may be deployed in various alternative embodiments wherein additional or alternative applications are supported. As such, it will be apparent that the methods and systems described herein may be generally applicable to supporting any Diameter applications.

DRA 200 may include a number of components such as Diameter stack 205, message handler 210, rule engine 215, rule storage 220, user interface 225, context creator 230, context artifact storage 240, message dictionary 245, or custom attribute storage 250.

Diameter stack 205 may include hardware or executable instructions on a machine-readable storage medium configured to exchange messages with other devices according to the Diameter protocol. Diameter stack 205 may include an interface including hardware or executable instructions encoded on a machine-readable storage medium configured to communicate with other devices. For example, Diameter stack 205 may include an Ethernet or TCP/IP interface. In various embodiments, Diameter stack 205 may include multiple physical ports.

Diameter stack 205 may also be configured to read and construct messages according to the Diameter protocol. For example, Diameter stack may be configured to read and construct CCR, CCA, AAR, AAA, RAR, and RAA messages. Diameter stack 205 may provide an application programmer's interface (API) such that other components of DRA 200 may invoke functionality of Diameter stack. For example, rule engine 215 may be able to utilize the API to read an attribute-value pair (AVP) from a received CCR or to modify an AVP of a new CCA. Various additional functionalities will be apparent from the following description.

Message handler 210 may include hardware or executable instructions on a machine-readable storage medium configured to interpret received messages and invoke rule engine 215 as appropriate. In various embodiments, message handler 210 may extract a message type from a message received by Diameter stack 205 and invoke the rule engine using a rule set that is appropriate for the extracted message type. For example, the message type may be defined by the application and command of the received message. After the rule engine 215 finishes evaluating one or more rules, message handler 210 may transmit one or more messages via Diameter stack based upon one or more context object actions invoked by the rule engine 215.

Rule engine 215 may include hardware or executable instructions on a machine-readable storage medium configured to process a received message by evaluating one or more rules stored in rule storage 220. As such, rule engine 215 may be a type of processing engine. Rule engine 215 may retrieve one or more rules, evaluate criteria of the rules to determine whether the rules are applicable, and specify one or more result of any applicable rules. For example, rule engine 215 may determine that a rule is applicable when a received Gx CCR includes a destination-host AVP identifying DRA 200. The rule may specify that the destination-host AVP should be changed to identify a PCRB before the message is forwarded.

Rule storage 220 may be any machine-readable medium capable of storing one or more rules for evaluation by rule engine 215. Accordingly, rule storage 220 may include a machine-readable storage medium such as read-only memory (ROM), random-access memory (RAM), magnetic disk storage media, optical storage media, flash-memory devices, and/or similar storage media. In various embodiments, rule storage 220 may store one or more rule sets as a binary decision tree data structure. Various other data structure for storing a rule set will be apparent.

It will be understood that, while various components are described as being configured to perform functions such as evaluating rules or accessing context objects based on rules, such configurations may not require any rules to be present in rule storage. For example, rule engine 215 may be configured to evaluate a rule including a context object reference even if no such rule is stored in rule storage 220. Thereafter, if a user adds such a rule to rule storage, rule engine 215 may process the rule as described herein. In other words, as used herein, the phrase "configured to" when used with respect to functionality related to rules will be understood to mean that the component is capable of performing the functionality as appropriate, regardless of whether a rule that requests such functionality is actually present.

User interface 225 may include hardware or executable instructions on a machine-readable storage medium configured to enable communication with a user. As such, user interface 225 may include a network interface (such as a network interface included in Diameter stack 205), a monitor, a keyboard, a mouse, or a touch-sensitive display. User interface 225 may also provide a graphical user interface (GUI) for facilitating user interaction. User interface 225 may enable a user to customize the behavior of DRA 200. For example, user interface 225 may enable a user to define rules for storage in rule storage 220 and evaluation by rule engine 215. Various additional methods for a user to customize the behavior of DRA 200 via user interface 225 will be apparent to those of skill in the art.

According to various embodiments, rule storage 220 may include rules that reference one or more "contexts" or "context objects." In such embodiments, context creator 230 may include hardware or executable instructions on a machine-readable storage medium configured to instantiate context objects and provide context object metadata to requesting components. Context objects may be instantiated at run time by context creator 230 and may include attributes or actions useful for supporting the rule engine 215 and enabling the user to define complex rules via user interface 225. For example, context creator 230 may provide context objects representing various Diameter messages, previous routing decisions, or subscriber profiles.

Upon DRA 200 receiving a Diameter message to be processed, message handler 210 may send an indication to context creator 230 that the appropriate context objects are to be instantiated. Context creator 230 may then instantiate such context objects. In some embodiments, context creator 230 may instantiate all known context objects or may only instantiate those context objects actually used by the rule set to be applied by rule storage 220. In other embodiments, context creator 230 may not instantiate a context object until it is actually requested by the rule engine 215.

Context creator 230 may additionally facilitate rule creation by providing context metadata to user interface 225. In various embodiments, context creator 230 may indicate to user interface 225 which context objects may be available for a rule set being modified and what attributes or actions each context object may possess. Using this information, user interface 225 may present a point-and-click interface for creating complex rules. For example, user interface 225 may enable the user to select a desired attribute or action of a context object from a list for inclusion in a rule under construction or modification.

Context creator 230 may rely on one or more context artifacts stored in context artifact storage 240 in establishing context objects. As such, context artifact storage 240 may be any machine-readable medium capable of storing one or more context artifacts. Accordingly, context artifact storage 240 may include a machine-readable storage medium such as read-only memory (ROM), random-access memory (RAM), magnetic disk storage media, optical storage media, flash-memory devices, and/or similar storage media. Context artifact storage 240 may store artifacts in various forms such as, for example, run-time libraries. In various embodiments, such run-time libraries may be stored as Java archive (.jar) files.

Each context artifact may define the attributes or actions available for a context object. In various embodiments, the context artifact may define one or more functions to be executed when an attribute or action is accessed. Such functions may utilize other functionality of the DRA 200, such as accessing the API of the Diameter stack, or may return values to the component that called the attribute or action. The context artifact may also include tags or other metadata for context creator 230 to provide to user interface 225 for describing the actions and attributes of the context object. In exemplary DRA 200, context artifact storage 240 may store context artifacts defining a message context and one or more computational contexts. These context artifacts may be used by context creator 230 at run-time to instantiate different types of context objects. As such, context creator 230 may be viewed as including a message context module 232 and a computational contexts module 236. In various embodiments, a user may be able to define new context artifacts via user interface 225 for storage in context artifact storage, such as by specifying an existing file (e.g. a .jar file).

Message context module 232 may represent the ability of context creator 230 to generate context objects representing and providing access to Diameter messages. For example, message context module 232 may generate a context object representing the received message. In various embodiments, message context module 232 may also be configured to generate a context object representing a request message or an answer message associated with the received Diameter message, as appropriate. As such, message context module 232 may be viewed as including a received message submodule 233, a related request submodule 234, and a related answer submodule 235.

The contents of Diameter messages may vary depending on the application and command type. For example, an Rx RAA message may include different data from a GX CCR message. Such differences may be defined by various standards governing the relevant Diameter applications. Further, some vendors may include proprietary or otherwise non-standard definitions of various messages. Message context module 232 may rely on message definitions stored in message dictionary 245 to generate message contexts for different types of Diameter messages. For example, upon receiving a Diameter message, message handler 210 may pass the application and command type to the context creator 230. Message context module 232 may then locate a matching definition in message dictionary 245. This definition may indicate the AVPs that may be present in a message of the specified type. Message context module 232 may then instantiate a message context object having attributes and actions that match the AVPs identified in the message definition.

Message dictionary 245 may be any machine-readable medium capable of storing one or more context artifacts. Accordingly, message dictionary 245 may include a machine-readable storage medium such as read-only memory (ROM), random-access memory (RAM), magnetic disk storage media, optical storage media, flash-memory devices, and/or similar storage media. Message dictionary 245 may include various message definitions in appropriate forms such as, for example, XML files. Message dictionary 245 may include a number of predefined definitions included with the DRA 200 by a supplier. In various embodiments, a user may be able to provide new, user-defined message definitions via user interface 225. For example, if the user wishes to support an application not already defined by the predefined definitions, the user may generate or otherwise obtain a definition file for storage in message dictionary 245. In various embodiments, the user-defined definitions may be stored in a different portion of message dictionary, such as a different directory, from the predefined definitions.

In various embodiments, the user may also be able to extend predefined definitions via user interface 225. The user may be able to provide extension definitions that define new AVPs or specify additional AVPs to occur in a particular message type. For example, a user may wish to support a proprietary AVP within an Rx AAR. To provide such support, the user may provide a definition file, such as an XML file, defining the proprietary AVP and indicating that the proprietary AVP may be present in an Rx AAR. Such extension definitions may also be stored in a different area of message dictionary 245 from the predefined definitions. Message context module 232 may be configured to apply any applicable extension definitions when instantiating a new message context object or providing context metadata to user interface 225.

With regard to some AVPs, whether standard or proprietary, the data included therein may be expressed in a manner that is less-than-intuitive for the purposes of rule creation via the user interface 225 or for rule evaluation against the data by the rule engine 215. For example, various standards define a Framed-IP-Address AVP that stores an IP address as an Octet-String data type. As such, the value stored therein is stored and expressed as a byte sequence such as 0x0a0a0a0a. A user creating rules, however, may be more familiar with the dotted decimal form of an IP address and, intuitively, may write rules expecting the IP address to be stored and expressed according to this different data type. For example, the user may expect the above IP address to instead be expressed as 10.10.10.10.

As another example, various standards define a Subscription-Id AVP which includes a Subscription-Id-Type AVP and a Subscription-Id-Data AVP. The Subscription-Id-Data AVP is stored as a UTF8String but, based on the value of the Subscription-Id-Type, may be more intuitively expressed as an integer, floating point number, string, Boolean, another data type, or groups thereof. For example, if the Subscription-Id-Type AVP identifies an international mobile subscriber identity (IMSI) type, then the data in the Subscription-Id-Data AVP may be more intuitively expressed as three integers: an integer for the mobile country code (MCC), an integer for the mobile network code (MNC), and a long integer for the mobile subscription identification number (MSIN). As another example if the Subscription-Id-Type AVP identifies a network access identifier (NAI) type, the data in the Subscription-Id-Data AVP may be more intuitively expressed as two strings: a string for a Realm and a string for a User Name. Further different schemes may be appropriate for other Subscription-Id-Type AVP values such as E 164 and Session Initiation Protocol (SIP) types.

To enable alternative representations of various AVPs, such as the Subscription-Id AVP and Framed-IP-Address AVP, the context creator 230 may support custom attribute objects. In various embodiments, message definitions may include one or more entries identifying a custom attribute and a custom attribute implementer used to create a custom attribute object that represents the custom attribute. In other embodiments, the context creator 230 may read this information from a source separate from the message definitions and dedicated to custom attributes. Thereafter, the context creator may ensure that when a message definition references an AVP for which a custom attribute is identified, that the custom attribute implementer is used to create an object to represent that AVP. For example, a message definition for a Gx CCR message, or an XML file separately defining custom attributes, may include the following XML snippet identifying a custom attribute for the Subscription-Id and Framed-IP-Address AVPs:

```
<customAttributeImplementerDefinition xmlns=
"customAttributeImplementerDefinition">
    <attributeImplementer name = "Subscription-Id" implementer =
       com.alcatel.tpapps.ddm.common.sourcecontexts.annotated.
       customattrs.SubscriptionId"/>
    <attributeImplementer name = "Framed-IP-Address" implementer =
       com.alcatel.tpapps.ddm.common.sourcecontexts.annotated.
       customattrs.IPAddress"/>
</customAttributeImplementerDefinition>
```

When establishing a message context for a message having an AVP for which a custom attribute is defined, the context creator 230 may access the custom attribute implementer referenced by the message definition and create a custom attribute object to represent the AVP. The custom attribute implementer may be a runtime library, such as a as Java archive (.jar) file, that defines a class to represent the custom attribute object. The custom attribute implementer may include one or more variables and one or more functions that provide actions or attributes for use by the rule engine. These functions may provide the value of the AVP to the rule engine according to one or more data types other than the data type of the AVP value.

The custom attribute implementer may include annotations or tags specifying various metadata for use by the DRA. For example, a custom attribute implementer for an IP Address object may read, in part:

```
@AvpConverters(@AvpConverter(avpFormatClass =
"OctetStringFormat",
       converterClass = "com.alcatel.tpapps.ddm.common.
       sourcecontexts.annotated." +
              "customattrs.IPAddressConverter"))
public class IPAddress implements CustomAttributeImplementer
{
    private IPAddressValue value = null;
    public static final String AS_IP_ADDRESS = "as-IPAddress";
    public static final String SET = "set";
    public static final String REMOVE = "remove";
    private static final int BITS_PER_BYTE = 8;
    public IPAddress(byte[ ] aInAddressBytes)
    {
       if (aInAddressBytes != null)
       {
          value = new IPAddressValue(aInAddressBytes,
              aInAddressBytes.length * BITS_PER_BYTE);
       }
    }
    @DDMRuleAttribute(name = AS_IP_ADDRESS)
    public IPAddressValue asIPAddress( )
    {
       return value;
    }
    @DDMRuleAttribute(name = SET)
    public void setIPAddress(String aInAddress)
    {
          value = new IPAddressValue(aInAddress);
    }
```

-continued

```
    @DDMRuleAttribute(name = REMOVE)
    public void remove(String aInIgnore)
    {
       value = null;
    }
}
```

In the code snippet above, multiple annotations may be provided in the @DDMRuleAttribute tag. These annotations may specify a name for the following function to be used in creation and evaluation of rules. For example, a rule reference to Gx CCR.Framed-IP-Address.as-IPAddress may be evaluated by the rule engine 215 by invoking the asIPAddress( ) function of the IPAddress object. This IPAddress object may have been instantiated from the custom attribute implementer at the same time that the Gx CCR context object was created for processing the received message. In various embodiments, this metadata may also be provided to the user interface 225 for the purposes of rule creation. For example, during rule creation, the user interface may present the user with a list of available attributes and actions, including the "as-IPAddress" attribute and the "set" and "remove" actions to the user as available for inclusion in a rule.

Various embodiments may utilize an additional "converter" class to instantiate custom attributes objects based off of the custom attribute implementer. The converter class may be a runtime library, such as a as Java archive (.jar) file, that defines a class that serves to perform various conversion functions. Such a converter class may include a function to create a new instance of a custom attribute object from raw message data. In some embodiments, the converter class may also include a function to convert the data of a custom attribute object back to raw message data, for the purpose of "flushing" changes to the custom attribute object back to the underlying message. This flush may occur at various times such as, for example, as soon as the new data is provided, after one or more additional rules have been evaluated, or after the rule engine has finished processing the message. In some such embodiments, the custom attribute implementer may include an annotation specifying the converter class that is to be used when creating or flushing a custom attribute object. In the above example, the "@AvpConverters" tag may be used to denote an annotation that the appropriate converter class for the IPAddress Custom Attribute Implementer is "com.alcatel.tpapps.ddm.common.sourcecontexts.annotated.customattrs.IPAddressConverter." An exemplary converter class for the IPAddress Custom Attribute Implementer may read, in part,

```
public class IPAddressConverter implements Converter<IPAddress>
{
    @SuppressWarnings({"UnusedDeclaration"})
    public IPAddressConverter( )
    {
    }
    @Override
    public byte[ ] convertFrom(IPAddress aInValue)
    {
       return aInValue.asIPAddress( ).getAddressBytes( );
    }
    @Override
    public IPAddress convertTo(byte[ ] aInValue)
    {
       return new IPAddress(aInValue);
    }
    @Override
    public boolean canConvertNullToPojoValues( )
```

```
{
    // This converter can convert a null AVP to a POJO.
    return true;
  }
}
```

The custom attribute implementers and converter classes may be stored in the custom attribute storage 250, which may be any machine-readable medium capable of storing one or more context artifacts. Accordingly, the custom attribute storage 250 may include a machine-readable storage medium such as read-only memory (ROM), random-access memory (RAM), magnetic disk storage media, optical storage media, flash-memory devices, and/or similar storage media.

As noted above, upon receiving a Diameter message, message handler 210 may extract the application and command type and pass this information to context creator 230, which then may locate any applicable definitions, custom attribute implementers, and converter classes to instantiate a new received message context object and any appropriate custom attribute objects. Received message submodule 233 may be further configured to associate the new context object with the received Diameter message itself. For example, received message submodule 233 may copy the received Diameter message from Diameter stack 205 into a private or protected variable. Alternatively, received message submodule 233 may store an identification of the Diameter message useful in enabling access to the Diameter message via the API of the Diameter stack 205.

In various embodiments, DRA 200 may support the use of inverse message contexts. In such embodiments, upon extracting the command type from the received Diameter message, message handler 210 may identify the inverse command type as well. In some such embodiments, message handler 210 may implement a look-up table identifying the inverse for each message command. For example, upon determining that a received Diameter message is a Gx CCR, the message handler may determine that the inverse message would be a Gx CCA. Message handler 210 may pass this information to context creator 230 as well.

Upon receiving an inverse message type, message context module 232 may instantiate an inverse message context object and any appropriate custom attribute objects in a manner similar to that described above with regard to the received message context object. Related request submodule 234 or related answer submodule 235, as appropriate, may also associate the new context object with message data. If the inverse message is a request message, related request module 234 may identify a previously-processed request message stored in Diameter stack 205 and associate the message with the new context object in a manner similar to that described above. In various embodiments, upon receiving an answer message, Diameter stack 205 may locate the previously-processed and forwarded request message to which the answer message corresponds. Diameter stack 205 may present this related request message through the API for use by context creator 230 or other components of DRA 200. By associating the previous request message with the related request context object, rule engine 215 may be provided with attributes capable of accessing the AVPs carried by the request message that prompted transmission of the answer message being processed.

When the inverse message is an answer message, on the other hand, related answer module 235 may construct a new answer message by, for example, requesting, via the API, that Diameter stack 205 construct the answer message. The new answer message may be completely blank or may include at least some values copied over from the received Diameter request message. Related answer module 235 may associate the new context object and any appropriate custom attribute objects with the new answer message in a manner similar to that described above with respect to received message module 233. The related answer context object may then provide rule engine 215 with access to various actions capable of modifying the new answer message. For example, the rule engine may utilize an action of the related answer context object to set a result-code AVP of the answer message, thereby indicating to the message handler 210 that the answer should be sent back to the device that sent the received request. Message handler 210 may also then refrain from forwarding the received request message to any other devices.

As noted above, context creator 230 may be capable of defining other context objects that do not represent a Diameter message. Such context objects may be referred to as "computational contexts" and may also be defined by contexts artifacts in context artifact storage 240. As such, the context creator 230 may be seen to include a computational contexts module 236 that instantiates computational contexts for use by the rule engine 215. Exemplary computational contexts may include objects that provide access to a subscription profile, a previous routing decision, a load balancer, and system level functions. Various additional computational contexts will be apparent.

It should be noted that while rule storage 220, context artifact storage 240, message dictionary 245, and custom attribute storage 250 are illustrated as separate devices, one or more of these components may be resident on multiple storage devices. Further, one or more of these components may share a storage device. For example, rule storage 220, context artifact storage 240, message dictionary 245, and custom attribute storage 250 may all refer to portions of the same hard disk or flash memory device.

FIG. 3 illustrates an exemplary method 300 for processing Diameter messages. Method 300 may be performed by the components of DRA 200 such as, for example, Diameter stack 205, message handler 210, rule engine 215, or context creator 230.

Method 300 may begin in step 305 and proceed to step 310 where the DRA 200 may receive a Diameter message to be processed. Next, in step 315, the DRA 200 may extract a message type from the received Diameter message. In various embodiments, the message type may be defined by the application and command type of the message. Then, in step 320, the DRA may use the extracted message type to establish a message context object to wrap the received Diameter message. In a similar manner, the DRA 200 may establish a message context object for an inverse of the Diameter message in step 325. For example, the DRA 200 may use a lookup table to identify the inverse message type of the extracted message type and request a new message context based on the inverse message type. It will be understood that steps 320 and 325 may include the establishment of one or more custom attribute objects as part of the respective context objects established therein.

The DRA 200 may then, in step 330, proceed to establish any other computational context objects for which the DRA 200 stores a context artifact or which the rule engine may request. For example, the DRA 200 may establish a routing decision context object and a subscriber record context object. After the appropriate context objects have been at least instantiated, method 300 may proceed to step 335 where the DRA 200 may select one or more appropriate rule sets to evaluate in processing the received Diameter message. In various embodiments, the DRA 200 may store a rule set for each message type. In some embodiments, DRA 200 may additionally or alternatively store a rule set that is generally applicable to all Diameter messages, all Diameter messages of a particular application, or another subset of Diameter messages.

After identifying the appropriate rule sets, the DRA 200 may evaluate the selected rule set or tables against the instantiated contexts in step 340. The individual rules may include references to various components of the context objects, herein referred to as "context object references." Such components may constitute attributes or actions of the context objects. To evaluate a rule including such a reference, the DRA may access the referenced component. For example, an attribute of a context object may be used in a comparison to determine whether a rule is applicable or an action of a context object may be used in applying the result of a rule. Where the context object reference further references a custom attribute object, the DRA may invoke the requested function of the custom attribute object. Various additional uses for a reference to a context object will be apparent. After applying the appropriate rule sets, the DRA 200 may transmit one or more messages to other devices in step 345. For example, the DRA may forward the Diameter message, which may be modified, to another device or may transmit an answer back to the device that sent the received message. Method 300 may proceed to end in step 350.

FIG. 4 illustrates an exemplary method for establishing a message context. Method 400 may correspond to step 320 or step 325 of method 300. Method 400 may be performed by the components of DRA 200 such as, for example, context creator 230.

Method 400 may begin in step 405 and proceed to step 410 where the DRA 200 may identify the application and command for the new context object. For example, a context creator may receive the application and command from a message handler. Alternatively, a context creator may extract the application and command from the received Diameter message or identify an inverse message type for the message type of the received Diameter message. After determining a message type for the new context object, the DRA 200 may begin to locate a definition for the message type by querying the predefined message dictionary in step 415.

In step 420, the DRA 200 may determine, from the located definition, whether any AVPs are associated with custom attributes. For example, the DRA 200 may determine whether the message definition itself defines an AVP as a custom attribute. Alternatively, the DRA 200 may determine whether any AVPs identified in the message definition are tied to custom attributes elsewhere by, for example, a dedicated custom attribute XML file. Various additional methods for determining whether a context object should be established with a custom attribute will be apparent.

If the message context should include a custom attribute, the method 400 may proceed to step 425, where the DRA 200 may invoke the appropriate function of a converter class to generate the custom attribute object. For example, the DRA 200 may call a conversion function of the converter class identified by the associated custom attribute implementer, passing in the raw value of the AVP, to receive an instance of a custom attribute object that corresponds to the AVP. The DRA 200 may perform the actions associated with step 425 for each distinct custom attribute associated with the message. If the AVP is a grouped AVP which is declared as multi-valued, then the DRA may instantiate multiple custom attribute objects which may be individually accessed by the rule engine through use of an index or any other method for selecting one or more items from a group. Then, in step 430, the DRA 200 may use the located definition, which may be predefined or user-defined, and custom attribute objects to instantiate a new message context. For example, the DRA 200 may instantiate a message context object having attributes and actions that correspond to the AVPs and other data specified by the definition as potentially being carried by a message having the relevant message type. Further, the DRA 200 may insert any custom attribute objects into the new message context object.

If, on the other hand, the received message is not associated with any custom attributes, the method 400 may proceed from step 420 to step 435 where the DRA 200 may use the located definition, which may be predefined or user-defined, to instantiate a new message context. For example, the DRA 200 may instantiate a message context object having attributes and actions that correspond to the AVPs and other data specified by the definition as potentially being carried by a message having the relevant message type. Step 435 may correspond generally to step 430, but may not incorporate any custom object attributes.

After instantiating the message context object in step 430 or step 435, method 400 may proceed to step 440. In step 440, the DRA 200 may associate the new message context object with message data. For example, if the message context object is associated with the received Diameter message, the DRA 200 may configure the context object to access fields of the received Diameter message stored in a Diameter stack. As another example, if the message context object is associated with an inverse message of the received Diameter message, such as a related request or a related answer, the DRA 200 may configure the context object to access fields of the inverse Diameter message stored in a Diameter stack. Method 400 may then proceed to end in step 445.

Figure 5:
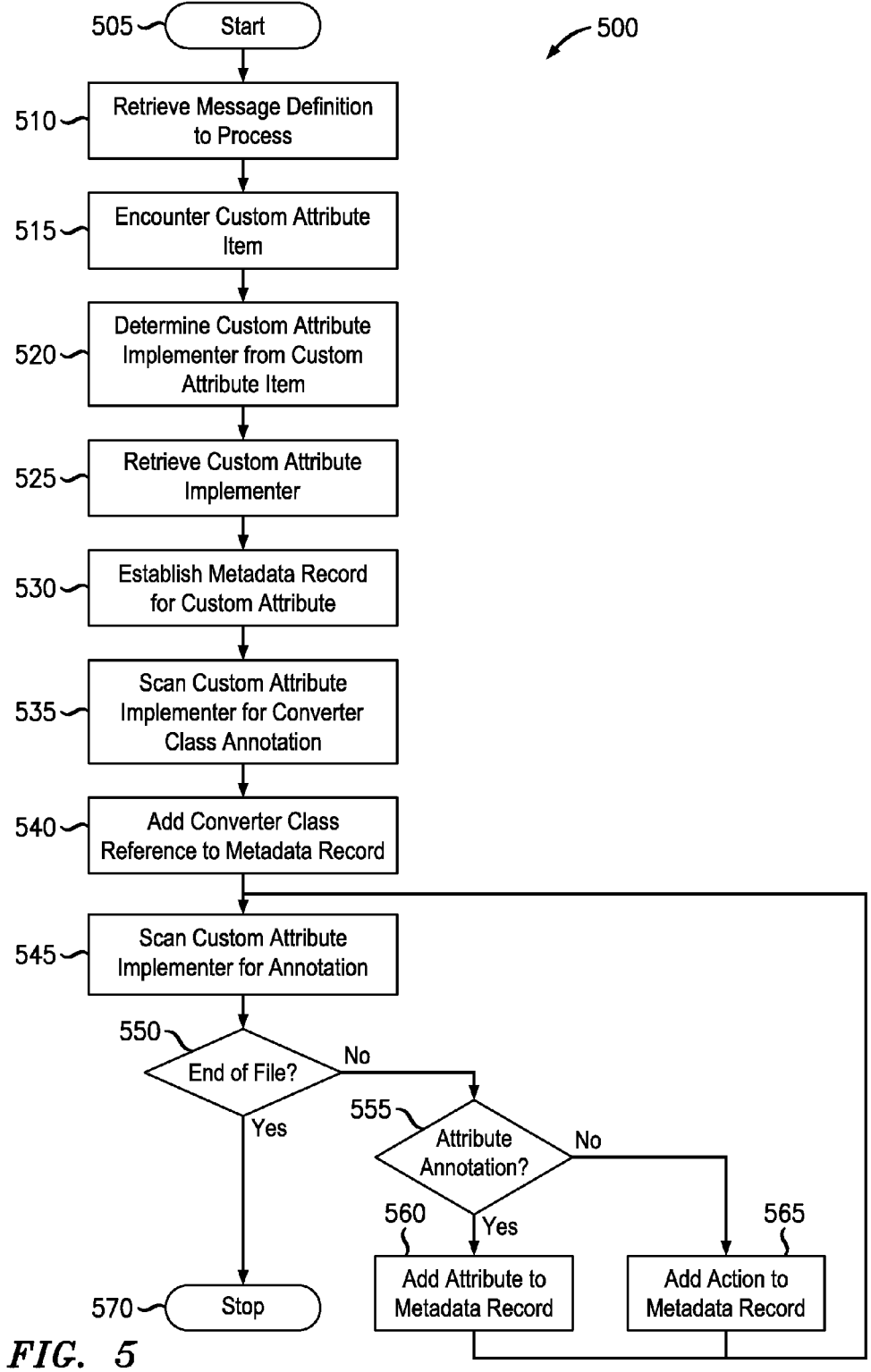
FIG. 5 illustrates an exemplary method for generating metadata for a message context object.

FIG. 5 illustrates an exemplary method 500 for generating metadata for a message context object. Method 500 may be performed by the components of DRA 200 such as user interface 225 or context creator 230. Method 500 may be performed at various times such as, for example, during system start up, upon request by a user interface, or upon request by a rule engine. In some embodiments, method 500 may be performed at the same time as step 415 of method 400 or step 330 of method 300.

Method 500 may begin in step 505 and proceed to step 510 where the DRA may retrieve a message definition to process. This may involve retrieving message definition from a message dictionary or simply identifying the message definition already retrieved in another method such as method 400. Next, in step 515, the DRA may while processing the message definition, encounter a custom attribute item. As noted above, the custom attribute item may be recognized based on the message definition itself or some other file (e.g., a previously-processed file that defines custom attributes) identifying an AVP as a custom attribute. Upon encountering the custom attribute item, the DRA may, in step 520, determine which custom attribute implementer is associated with the custom attributes and, in step 525, retrieve the custom attribute implementer from storage. Next, in step 530, the DRA may establish a new metadata record for the custom attribute, including an identification such as the name of the associated AVP or the name of the custom attribute implementer. In the above example of a Framed-IP-Address AVP, the DRA may establish a metadata record that identifies itself as being associated with the Framed-IP-Address AVP or the IPAddress custom attribute implementer.

In step 535, the DRA may begin to fill out the metadata record by first scanning the custom attribute implementer for a converter class annotation. For example, the DRA may tokenize or otherwise parse the custom attribute implementer to locate an annotation including the string "AvpConverters" or another annotation. After locating the annotation, the DRA may, in step 540, establish a new metadata record including the converter class associated with the annotation. In the example above, the DRA may add an indication to the metadata record that the associated converter class is the IPAddressConverter class.

Next, in step 545, the DRA may scan the custom attribute implementer for an additional annotation. In various embodiments, the DRA may tokenize or otherwise parse the custom attribute implementer to locate an annotation including the string "DDM," "DDMRuleAttribute," or another annotation. After attempting to locate such an attribute, the DRA may determine in step 550 whether the end of the artifact has been reached. If the DRA has reached the end of the file, method 500 may proceed to end in step 570. Otherwise, method 500 may proceed to step 555.

In step 555, the DRA may determine whether the annotation corresponds to an attribute or an action of a context object. In various embodiments, the annotation itself may specify whether the annotation applies to an attribute or action. In other embodiments, the DRA may evaluate the following function or variable to make this determination. For example, the DRA may determine that if the following function returns a value, then the annotation may correspond to an attribute. As another example, the DRA may determine that if the following function does not return any value, then the annotation may correspond to an action. If the annotation corresponds to an attribute, the DRA may, in step 560, add a new attribute to the metadata record associated with the appropriate class function. In the example above, the DRA may add the attribute name "as-IPAddress" to the metadata record in association with the function asIPAddress( ). If the annotation corresponds to an action, the DRA may, in step 565, add a new action to the metadata record associated with the appropriate class function. In the example above, the DRA may add the action name "set" to the metadata record in association with the function setIPAddress(String aInAddress). Method 500 may proceed to continue analyzing the artifact for additional annotations by looping from either step 560 or 565 back to step 545.

Figure 6:
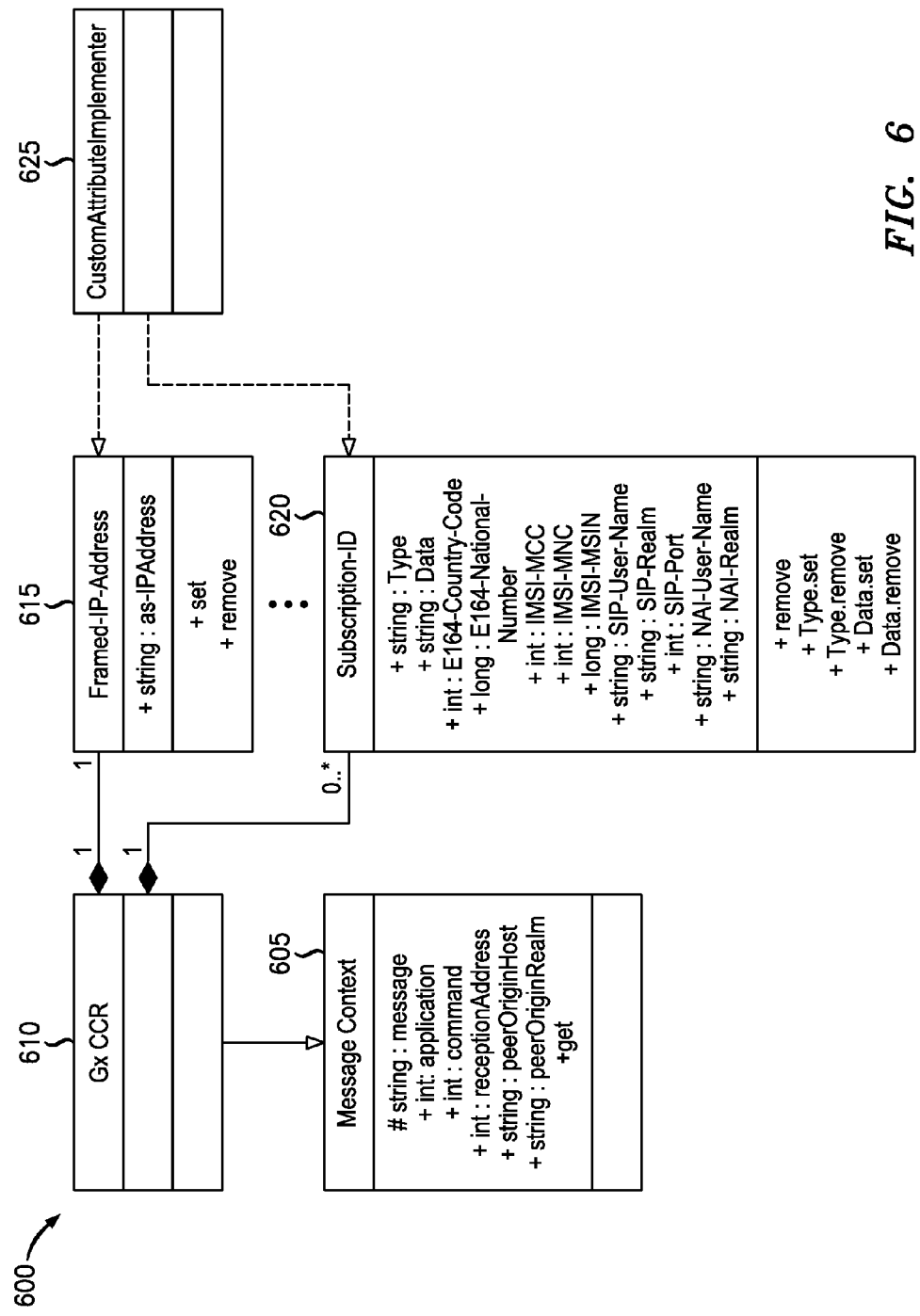
FIG. 6 illustrates an exemplary class diagram for a message context object.

FIG. 6 illustrates an exemplary class diagram 600 for a message context object. Class diagram 600 may represent a message context instantiated to represent a Gx CCR that includes two custom attribute objects. Gx CCR object 610 may be associated with a received Gx CCR Diameter message currently being processed by the DRA 200 or may be associated with a previously processed Gx CCR Diameter message that is related to a Gx CCA currently being processed by the DRA 200. Class diagram 600 may indicate an actual implementation of a message context object or may describe a context object as viewed by a user even though an actual implementation differs. For example, as will be understood, a message context object may be implemented as a generic "Diameter message" class where the contents may include generic "AVP" objects that hold underlying binding data. Such AVP objects, including custom attribute objects, may be instantiated only on demand. Such an implementation may be accessible by a user in the same manner as an object implemented according to class diagram 600.

Gx CCR context object 610 may extend, or otherwise be a specific instantiation of a base message context object 605. Message context object 605 may define data and functions that may be generally used by any message context object regardless of the message type. In various embodiments, message context object 605 may provide access to the Diameter message by, for example, storing a protected copy of the Diameter message in a "message" variable or storing information sufficient to access the Diameter message actually stored by the Diameter stack.

Base message context object 605 may also provide various data related to the Diameter message, but not actually stored within the message, such as data associated with the message by the Diameter stack. For example, the message context object 605 may include public variables storing identifications of an application, command, reception address, peer origin host, and peer origin realm. The message context object 605 may also include a "get" attribute that may return a handle to the message object itself that may be used, for example, to access other objects contained within message context object 605. In various embodiments, a rule may simply reference the object name to access a "get" attribute, without specifying the "get" attribute itself. For example, a rule may reference "Gx CCR.Session-ID" to retrieve the Session-ID value, instead of "Gx CCR.Session-ID get."

Gx CCR context object 610 may inherit attributes or actions from message context 605, while including additional attributes or actions that are specific to a Gx CCR message. It will be understood that context objects instantiated based on other message type definitions or extension definitions may include different objects, as specified by those definitions. Thus, Gx CCR context object 610 may include a number of nested objects 615, 620 representing various possible AVPs. Some such nested objects may constitute custom attribute objects, as instantiated from a custom attribute implementer. For example, Gx CCR context object 610 may include a Framed-IP-Address object 615 corresponding to a Framed-IP-Address AVP. In various embodiments, the Framed-IP-Address AVP may be a required AVP of Gx CCR messages. As such, the Gx CCR context object 510 may include a single Session-ID object 515. The Framed-IP-Address object 615 may be a custom attribute object and, as such, may be an instantiation of a specific custom attribute implementer, such as the exemplary custom attribute implementer detailed above, which may be a realization of a base CustomAttributeImplementer class 625. Further, the Framed-IP-Address object 615 may have been instantiated by a converter class, such as the exemplary converter class detailed above. Further, the Framed-IP-Address object 615 may include an "as-IPAddress" attribute as well as "set" and "remove" actions, as defined in the custom attribute implementer. The "as-IPAddress" attribute may provide a dotted decimal form IP address for use by the rule engine, while the "set" action may flush a dotted decimal IP address, via the converter class, to the underlying Diameter message in OctetString form. The "remove" action may cause the deletion of the associated Framed-IP-Address AVP from the underlying Diameter message.

As another example, the Gx CCR context object 610 may include zero or more Subscription-ID objects 620, which may correspond to any Subscription-ID AVPs carried by the underlying Diameter message. The Subscription-ID object 620 may be an instantiation of a specific custom attribute implementer which may be a realization of a base CustomAttributeImplementer class 625. As noted above, a Subscription-ID AVP may include two constituent AVPs: a Subscription-ID-Type AVP and a Subscription-ID-Data AVP. The Subscription-ID object 620 may provide access to the raw values stored in both of these AVPs via the "Type" and "Data" attributes respectively. This raw data may be expressed as a single string. Additionally or alternatively, the Subscription-ID object 620 may provide access to one or more alternative representations of the value stored in the Subscription-ID-Data AVP based on the value of the Subscription-ID-Type AVP. For example, if the Subscription-ID-Type AVP indicates that the subscription ID is an E 164 identifier, then the Subscription-ID object 620 may determine which part of the raw string corresponds to the country code, convert that part to an integer, and provide access to the integer value via the E164-Country-Code attribute. In a similar manner, the Subscription-ID object 620 may provide the national number from the raw string as a long integer via the E164-National-Number attribute. By presenting these attributes, the rule engine may be able to evaluate conditions against the country code or national number without first parsing and converting the value from the raw string. Further, the rule engine may assign new values for the country code or national number and have these changes committed to the raw string without having to define, in the rule, how to convert the provided value and then replace the appropriate substring in the raw data. As will be understood, different attributes that present different portions of the raw string as different data types may be utilized when the Subscription-ID-Type AVP indicates that the stored identifier is, instead, an IMSI, SIP, or NAI value.

Figure 7:
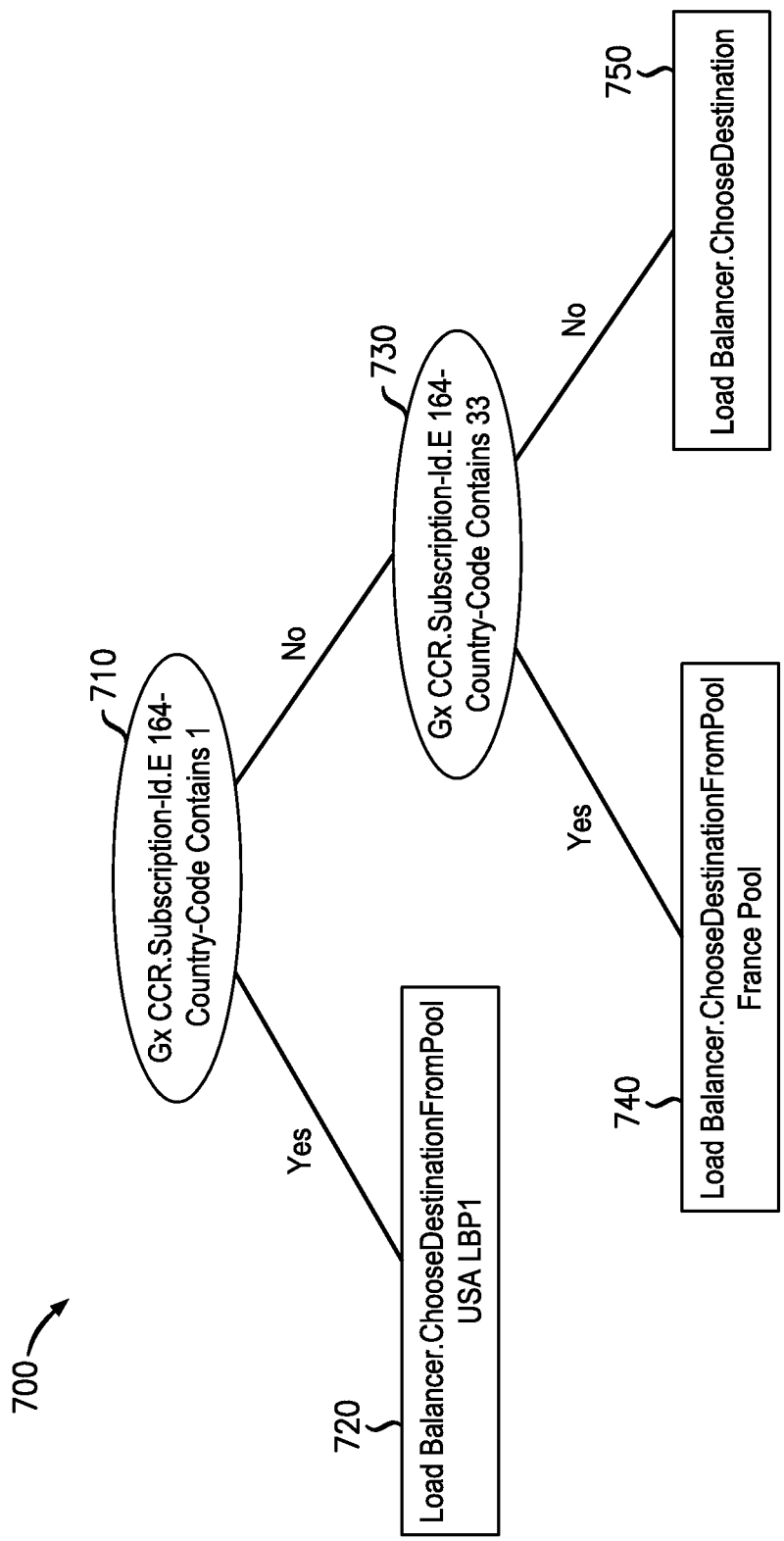
FIG. 7 illustrates an exemplary rule set.

FIG. 7 illustrates an exemplary rule set 700. Rule set 700 may be stored in a rule storage such as rule storage 220 of DRA 200. In various embodiments, rule set 700 may be stored as a binary decision tree, as illustrated. It will be apparent that various alternative arrangements may be used for storing a rule set. For example, rule set 700 may be stored as a plurality of records that each include a criteria field for evaluation to determine whether a rule is applicable and a result field storing an action to be taken when the rule is applicable. Further, rule set 700 may be stored as, for example, a table in a database stored in rule storage 220. Alternatively, rule set 700 could be a series of linked lists, an array, or a similar data structure. Thus, it should be apparent that rule set 700 may be an abstraction of the underlying data; any data structure suitable for storage of this data may be used.

Rule set 700 may be applicable to Gx CCR Diameter messages. Rule set 700 may have been generated based on user-provided pseudo-code such as the above example. A DRA may store separate message type-specific rule sets (not shown) for a number of different message types. Rule set 700 may include criteria nodes such as criteria nodes 710, 730 and result nodes such as result nodes 720, 740, 750. It will be apparent that rule set 700 is exemplary and that various embodiments may include rule sets (not shown) that are more complex than the rule set 700 as illustrated.

Criteria nodes may present a condition to be evaluated by a rule engine. Based on the evaluation, the rule engine may select another criteria node or a result node to evaluate. As an example, criteria node 710 may store the condition "Gx CCR-.Subscription-Id.E164-Country-Code Contains 1." Upon evaluation of criteria node 710, a rule engine may determine whether the condition is true or false. For example, the rule engine may read a "Subscription-Id.E164-Country-Code" attribute from a Gx CCR context object and determine whether the attribute contains the value "1". In accordance with the foregoing, this evaluation may entail accessing an attribute from a Subscription-Id custom attribute object stored within or otherwise associated with the Gx CCR context. As such, the evaluation may be able to easily determine whether the country code matches the condition without regard for other values stored together with the country code in the raw data string of the Subscription-Id-Data AVP. If the comparison returns true, the rule engine may move on to evaluate result node 720. Otherwise, the rule engine may move on the evaluate criteria node 730.

Result nodes may present one or more actions to be performed by a rule engine. Such actions may include, for example, modifying a Diameter message or transmitting a Diameter message to a particular device. As an example, result node 720 may indicate that the rule engine should access the action Load Balancer.ChooseDestinationFromPool and pass in the parameter value "USA LBP1." Upon encountering this instruction, the DRA 200 may invoke the specified action from the specified computational context and thereby effect the desired change to the Diameter message or other action.

Criteria node 730 may include a condition that has a further check against the "Subscription-Id.E164-Country-Code" attribute, this time determining whether the attribute contains the value "33." Again, this evaluation may include accessing the "E164-Country-Code" attribute of the Subscription-Id custom attribute object to determine whether the condition is met. If so, the rule engine may move on to evaluate result node 740. Otherwise, the rule engine may move on to evaluate result node 750.

Result node 740 may include an instruction to access the Load Balancer.ChooseDestinationFromPool action, but this time may specify a different parameter and thereby effect a different modification to the underlying Diameter message. The result node 750 may not specify a parameter and, instead, invoke the Load Balancer.ChooseDestination action which may effect a different modification to the underlying Diameter message.

According to the foregoing, various embodiments enable robust and dynamic handling of various Diameter messages at a diameter routing agent. In particular, by providing custom attribute implementers, raw data carried by various AVPs may be parsed and converted for use by a rules engine. This, in turn, may allow for more intuitive rule design by an administrator of the DRA.

It should be apparent from the foregoing description that various exemplary embodiments of the invention may be implemented in hardware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media. Further, as used herein, the term "processor" will be understood to encompass a microprocessor, field programmable gate array (FPGA), application-specific integrated circuit (ASIC), or any other device capable of performing the functions described herein.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method performed by a Diameter Routing Agent (DRA) for processing a Diameter message, the method comprising:
    receiving a Diameter message at the DRA from an origin device, wherein the Diameter message includes an attribute-value pair (AVP) having a first value represented according to a first data type;
    establishing a context object in response to receiving the Diameter message;
    establishing, within the context object, a custom attribute object that corresponds to the AVP and provides access to at least a portion of the first value represented according to a second data type, wherein the second data type is different from the first data type;
    evaluating a rule that includes a context object reference, wherein the evaluation includes accessing the custom attribute object based on the context object reference; and
    transmitting a message based on the evaluation of the rule.

2. The method of claim 1, wherein establishing the custom attribute object comprises:
    instantiating a converter object; and
    causing the converter object to instantiate the custom attribute object based on the AVP.

3. The method of claim 2, wherein accessing the custom attribute object comprises:
    determining a first new value for the at least a portion of the value, wherein the first new value is represented according to the second data type;
    invoking a method of the converter object that:
        generates a second new value based on the first new value, wherein the second new value is represented according to the first data type; and
        inserts the second new value type into the AVP.

4. The method of claim 1, wherein:
    the AVP includes a second value; and
    the custom attribute object selects the second data type for representation of the at least a portion of the first value based on the second value.

5. The method of claim 4, wherein the AVP is a Subscription-Id AVP, the first value is a Subscription-Id-Data AVP, and the second value is a Subscription-Id-Type AVP.

6. The method of claim 1, wherein:
    establishing the context object in response to receiving the Diameter message comprises:
        locating a message definition associated with a message type of the Diameter message, and
        identifying, in the message definition, a pointer to a custom attribute implementer; and
    establishing, within the context object, the custom attribute object comprises:
        instantiating the custom attribute implementer as the custom attribute object.

7. The method of claim 1, wherein the custom attribute object providing access to at least a portion of the first value represented according to a second data type comprises:
    providing access to a first portion of the first value represented according to the second data type; and
    providing access to a second portion of the first value.

8. The method of claim 7, wherein the second portion of the first value is represented according to a third data type that is different from the second data type.

9. The method of claim 1, wherein the AVP stores an IP address, the first data type is an OctetString type, and the second data type is a dotted decimal type.

10. A Diameter Routing Agent (DRA) for processing a Diameter message, the DRA comprising:
    a rule storage configured to store a rule that includes a context object reference;
    a Diameter stack configured to receive a Diameter message from an origin device, wherein the Diameter message includes an attribute-value pair (AVP) having a first value represented according to a first data type;
    a context creator configured to:
        establish a context object in response to receiving the Diameter message, and
        establish, within the context object, a custom attribute object that corresponds to the AVP and provides access to at least a portion of the first value represented according to a second data type, wherein the second data type is different from the first data type;
    a rule engine configured to evaluate the rule, wherein the evaluation includes accessing the custom attribute object based on the context object reference; and
    a message handler configured to transmit, via the Diameter stack, a message based on the evaluation of the rule.

11. The DRA of claim 10, wherein, in establishing the custom attribute object, the context creator is configured to:
    instantiate a converter object; and
    cause the converter object to instantiate the custom attribute object based on the AVP.

12. The DRA of claim 11, wherein, in accessing the custom attribute object, the rule engine is configured to:
    determine a first new value for the at least a portion of the value, wherein the first new value is represented according to the second data type;
    invoke a method of the converter object that:
        generates a second new value based on the first new value, wherein the second new value is represented according to the first data type; and
        inserts the second new value type into the AVP.

13. The DRA of claim 10, wherein:
    the AVP includes a second value; and
    the custom attribute object selects the second data type for representation of the at least a portion of the first value based on the second value.

14. The DRA of claim 13, wherein the AVP is a Subscription-Id AVP, the first value is a Subscription-Id-Data AVP, and the second value is a Subscription-Id-Type AVP.

15. The DRA of claim 10, wherein:
    in establishing the context object in response to receiving the Diameter message, the context creator is configured to:
        locate a message definition associated with a message type of the Diameter message, and
        identify, in the message definition, a pointer to a custom attribute implementer; and
    in establishing, within the context object, the custom attribute object, the context creator is configured to:

instantiate the custom attribute implementer as the custom attribute object.

16. The DRA of claim 10, wherein the custom attribute object providing access to at least a portion of the first value represented according to a second data type comprises:
providing access to a first portion of the first value represented according to the second data type; and
providing access to a second portion of the first value.

17. The DRA of claim 16, wherein the second portion of the first value is represented according to a third data type that is different from the second data type.

18. The DRA of claim 10, wherein the AVP stores an IP address, the first data type is an OctetString type, and the second data type is a dotted decimal type.

19. A non-transitory machine-readable storage medium encoded with instructions for execution by a Diameter Routing Agent (DRA) for processing a Diameter message, the medium comprising:
instructions for receiving a Diameter message at the DRA from an origin device, wherein the Diameter message includes an attribute-value pair (AVP) having a first value represented according to a first data type;
instructions for establishing a context object in response to receiving the Diameter message;
instructions for establishing, within the context object, a custom attribute object that corresponds to the AVP and provides access to at least a portion of the first value represented according to a second data type, wherein the second data type is different from the first data type;
instructions for evaluating a rule that includes a context object reference, wherein the evaluation includes accessing the custom attribute object based on the context object reference; and
instructions for transmitting a message based on the evaluation of the rule.

20. The non-transitory machine-readable storage medium of claim 19, wherein the instructions for establishing the custom attribute object comprise:
instructions for instantiating a converter object; and
instructions for causing the converter object to instantiate the custom attribute object based on the AVP.

21. The non-transitory machine-readable storage medium of claim 20, wherein the instructions for accessing the custom attribute object comprise:
instructions for determining a first new value for the at least a portion of the value, wherein the first new value is represented according to the second data type;
instructions for invoking a method of the converter object that:
generates a second new value based on the first new value, wherein the second new value is represented according to the first data type; and
inserts the second new value type into the AVP.

22. The non-transitory machine-readable storage medium of claim 19, wherein:
the instructions for establishing the context object in response to receiving the Diameter message comprise:
instructions for locating a message definition associated with a message type of the Diameter message, and
instructions for identifying, in the message definition, a pointer to a custom attribute implementer; and
the instructions for establishing, within the context object, the custom attribute object comprise:
instructions for instantiating the custom attribute implementer as the custom attribute object.

\* \* \* \* \*